(12) United States Patent
Yang et al.

(10) Patent No.: US 11,626,815 B2
(45) Date of Patent: Apr. 11, 2023

(54) HIGH-PRECISION RIGID-FLEXIBLE COUPLING ROTATING PLATFORM AND CONTROL METHOD THEREOF

(71) Applicant: Guangdong University of Technology, Guangzhou (CN)

(72) Inventors: Zhijun Yang, Guangzhou (CN); Jianbin Huang, Guangzhou (CN); Yutai Wei, Guangzhou (CN); Zhongyi Gao, Guangzhou (CN); Guanxin Huang, Guangzhou (CN); Youdun Bai, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 324 days.

(21) Appl. No.: 17/014,997

(22) Filed: Sep. 8, 2020

(65) Prior Publication Data
US 2021/0126557 A1    Apr. 29, 2021

(30) Foreign Application Priority Data

Oct. 23, 2019  (CN) .......................... 201911009965.6
Dec. 5, 2019   (CN) .......................... 201911235952.0

(51) Int. Cl.
*H02N 2/12*   (2006.01)
*F16M 11/20*  (2006.01)
*H02N 2/14*   (2006.01)

(52) U.S. Cl.
CPC ......... *H02N 2/123* (2013.01); *F16M 11/2014* (2013.01); *H02N 2/14* (2013.01)

(58) Field of Classification Search
CPC ...... H02N 2/123; H02N 2/14; F16M 11/2014; F16M 11/08; F16M 11/18
See application file for complete search history.

(56) References Cited

U.S. PATENT DOCUMENTS 7,259,106 B2    8/2007  Jain
9,888,667 B2    2/2018  Conger et al.
(Continued)

FOREIGN PATENT DOCUMENTS

CN      101666898 B         4/2013
CN      205184279 U    *    4/2016
(Continued)

*Primary Examiner* — Terrell L Mckinnon
*Assistant Examiner* — Ding Y Tan
(74) *Attorney, Agent, or Firm* — True Shepherd LLC; Andrew C. Cheng

(57) ABSTRACT

A novel high-precision rigid-flexible coupling rotating platform includes a foundation, a rigid bearing, a bearing sleeve, a core rotating platform, a rotating driver and a coder; the bearing sleeve is fixed on the foundation; the rigid bearing is in rotatable drive connection with the core rotating platform, and connected with the foundation through the bearing sleeve; an upper surface of the core rotating platform is provided with a plurality of groups of flexible hinges; when the rotating driver applies a driving force to rotate the core rotating platform, the driving force elastically deforms the flexible hinge rings. The flexible hinges are used and disposed on the upper surface of the core rotating platform; without disassembling the whole rotating platform, a corresponding group of flexible hinges can be changed but an assembling relationship between other groups of flexible hinges cannot be broken.

9 Claims, 4 Drawing Sheets

(56) References Cited

U.S. PATENT DOCUMENTS

| | | | |
|---|---|---|---|
| 2012/0034027 A1* | 2/2012 | Valois | F16C 11/12 |
| | | | 403/291 |
| 2014/0079469 A1* | 3/2014 | Sorvino | F16C 11/06 |
| | | | 403/220 |
| 2017/0356501 A1* | 12/2017 | Salas | F16C 41/00 |
| 2018/0104779 A1* | 4/2018 | Yang | B23Q 1/36 |

FOREIGN PATENT DOCUMENTS

| | | | | | |
|---|---|---|---|---|---|
| CN | 205744905 U | * | 11/2016 | | |
| CN | 108279561 A | * | 7/2018 | ............. | G05B 11/42 |
| CN | 108374833 A | * | 8/2018 | ............. | F16C 19/06 |
| CN | 110336494 A | * | 10/2019 | | |
| CN | 109175181 B | | 2/2020 | | |
| CN | 110932598 A | | 3/2020 | | |
| CN | 110941241 A | * | 3/2020 | | |

* cited by examiner

HIGH-PRECISION RIGID-FLEXIBLE COUPLING ROTATING PLATFORM AND CONTROL METHOD THEREOF

CROSS-REFERENCE TO RELATED APPLICATIONS

This application claims priority to Chinese Patent Applications No. 201911235952.0 with a filing date of Nov. 5, 2019 and No. 201911009965.6 with a filing date of Oct. 23, 2019. The content of the aforementioned applications, including any intervening amendments thereto, are incorporated herein by reference.

TECHNICAL FIELD

The disclosure relates to a rotating platform, and particularly relates to a novel high-precision rigid-flexible coupling rotating platform and a control method thereof

BACKGROUND OF THE PRESENT INVENTION

The rotating platform is widely used in the field of modern industry. The uncertain change in a surface roughness between kinematic pairs in the rotating platform can lead to uncertain change in the amplitude of a frictional resistance. However, in the processes of starting-up, stopping and micro rotation of the rotating platform, the speed of the rotating platform is relatively low, and the fluctuation of the amplitude of the above frictional resistance easily leads to a "crawling" phenomenon occurring in the rotating platform. Under the action of the closed-loop control system, the driver will overcome the frictional resistance through increase of the driving force to compensate the positioning error of the rotating platform. In the above compensation process, the rotating platform will experience the frequent status switching of "static→motion". In the process of "static→motion", the frictional resistance between the kinematic pairs can experience the status switching of "static friction force→dynamic friction force", and the difference between the static friction coefficient and the dynamic friction coefficient can lead to the sudden accelerated speed change of the above status switching, resulting in the "shaking" of the rotating platform near the final positioning position to affect the positioning accuracy.

How to reduce the positioning error influence caused by the friction state switching in the process of starting-up, stopping and micro rotation is an important problem to affect the execution precision of the rotating platform. Aiming at the above problems, at present, the existing solution is as follows:
1. An accurate friction force model is established to compensate the rotation control driving force. 2. A friction-free or low-friction motion pair design is adopted, for example, structure designs such as air bearing, magnetic bearing or flexible hinge are adopted.

A high-precision friction force model is difficult to establish due to factors such as micro-characteristic differences and manufacturing errors of a contact surface, between kinematic pairs, which leads to a fact that the rotation control system needs to use a complicated compensation control method.

The implementation cost of low-friction motion pairs such as air bearing or magnetic bearing is relatively high, which limits its use range. The flexible hinge, as an external friction-free motion pair, can realize continuous high-precision rotation depending on elastic deformation. The flexible hinge is often cooperated with the friction motion pair, and high-precision rotation is realized by compensating the rotation.

The patent CN 201911009965.6 discloses a rigid-flexible coupling rotating platform and a control method thereof The rigid-flexible coupling rotating platform compensates the rotation by means of the elastic deformation of the internal composite flexible hinge ring, and meanwhile double-feedback control is performed by virtue of two groups of coders, thereby reducing the positioning error influence caused by the friction state switching in the processes of starting up, stopping and micro rotation. Compared with the traditional rotating platform, the positioning accuracy of the rotating platform is effectively improved. However, this technical solution has the following defects: (1) the composite flexible hinge ring has a complicated structure, a main body ring is machined by at least using a five-axis machine tool, and the machining cost is high; (2) since the composite flexible hinge ring is arranged inside the rotating platform, when the flexible hinge needs to be changed, the composite flexible hinge ring is changed as long as the entire rotating platform is disassembled, so as to result in troublesome change and elapsed time; (3) when the different rigidities of the composite flexible hinge ring are needed to be adjusted, it is needed to prepare a plurality of groups of flexible hinge slices with different thicknesses; (4) a lot of parts are used, so machining and assembling precision requirements of many parts are high, leading to high machining cost and large assembling difficulty, so as to greatly affect the production efficiency.

SUMMARY OF PRESENT INVENTION

In order to overcome at least one defect in the above existing technology, the disclosure provides a novel high-precision rigid-flexible coupling rotating platform and a control method thereof. The flexible hinge of the rotating platform adopts an external combined structure in which subtly the flexible hinge and the core rotating platform are subtly and integrally designed so that the flexible hinge does not need to be reassembled when assembling, thereby decreasing the quantity of assembled parts and reducing the difficulty degree of assembling.

The objective of the disclosure can be realized by using the following technical solution:

Provided is a novel high-precision rigid-flexible coupling rotating platform, comprising a foundation, a rigid bearing, a bearing sleeve, a core rotating platform, a rotating driver and a coder, wherein the bearing sleeve is fixed on the foundation; the rigid bearing is in rotatable drive connection with the core rotating platform, and connected with the foundation through the bearing sleeve; an upper surface of the core rotating platform is provided with a plurality of groups of flexible hinges; when the rotating driver applies a driving force to rotate the core rotating platform, the driving force elastically deforms the flexible hinge rings; the coder comprises a first group of coders used for real-time measurement of a rotation angle of the core rotating platform and a second group of coders used for real-time measurement of a rotation angle of the rigid bearing.

The flexible hinges and the core rotating platform are integrally formed.

The first group of coders comprises a first coder annular code disc fixedly mounted on the core rotating platform and a first coder annular read head fixedly mounted on the foundation and corresponding to a position of the first coder annular code disc.

The second group of coders comprises a second annular coding disc fixedly mounted on an outer circumference of the core rotating platform and a second read head fixedly mounted on the foundation and corresponding to a position of the second annular coding disc.

The flexible hinges are symmetrically arranged.

The foundation is provided with an outer round sleeve sleeved on the core rotating platform, the second read head is fixedly mounted on the outer round sleeve; the rotating driver comprises a motor rotator connected with the core rotating platform and capable of applying the driving force to the core rotating platform under an action of electromagnetic force, and a motor stator fixed with the outer round sleeve.

A bearing inner ring of the rigid bearing is in interference fit connection with the core rotating platform, and a bearing outer ring of the rigid bearing is clamped and fixed by the bearing sleeve and a clamping member of the bearing outer ring.

The foundation is provided with a bottom cap covering the first group of coders.

The first coder annular code disc is fixedly connected to a bottom of the core rotating platform through a code disc connector; and the first coder annular read head is fixedly mounted on the outer round sleeve through a code disc fixing member.

Provided is a control method for a novel high-precision rigid-flexible coupling rotating platform, comprising the following steps:

S1, feeding back with dual coding discs, one reading the displacement of the flexible hinges before deformation, and the other reading the displacement of the flexible hinges after deformation;

S2, establishing a closed-loop control system using displacement feedback of the flexible hinges after deformation as main feedback;

S3, using a difference value of the displacements before and after deformation and a differential value thereof as a deformation amount and deformation velocity of the flexible hinges respectively, and obtaining an elastic disturbance force of the flexible hinges by multiplying the deformation amount and the deformation velocity with a stiffness and damping of the flexible hinges respectively;

S4, estimating the rest disturbance forces by an extended state observer adopting an active-disturbance-rejection-control algorithm; and S5, summing up the above disturbance forces and transforming into equivalent control quantity, and using the equivalent control quantity to modify a control quantity of the closed-loop control system to control a motor.

The disclosure has the following beneficial effects:

1. In the disclosure, the flexible hinge is adopted and disposed on the upper surface of the core rotating platform, that is, a structure where the flexible hinge is externally arranged, so as to solve the existing problem that the used composite flexible hinge ring has a complicated structure, a main body ring is machined by at least using a five-axis machine tool, and the machining cost is high. Moreover, without disassembling the entire rotating platform, corresponding groups of flexible hinges can be changed, an assembling relationship between other groups of flexible hinges is not broken, and the effective deformation length of the flexible hinge is changed through a fixture to change the rigidity of the flexible hinge so as to realize the adjustment of rigidity, thereby solving the existing problem that since the composite flexible hinge is arranged inside the rotating platform, when the flexible hinge needs to be changed, the composite flexible hinge ring is changed as long as the entire rotating platform is disassembled to result in troublesome change and elapsed time.

2. The flexible hinges and the core rotating platform of the disclosure can be integrally formed, that is, the flexible hinge and the core rotating platform can be designed into an integrated combination structure. When assembling, the flexible hinge does not need to be reassembled, thereby decreasing the quantity of assembled parts and reducing the difficulty coefficient of assembling, and solving the existing problems that when the different rigidities of the composite flexible hinge ring are needed to be adjusted, it is needed to prepare multiple groups of flexible hinge slices with different thicknesses. Moreover, a lot of parts are used, so machining and assembling precision requirements of many parts are high, leading to high machining cost and large assembling difficulty so as to greatly affect the production efficiency.

DESCRIPTION OF THE DRAWINGS

For more clearly illustrating the embodiments of the disclosure or technical solution in the prior art, accompanying drawings required to be used in embodiments, or the prior art will be simply introduced, obviously, the drawings in the following description are only some embodiments of the disclosure, and those skilled in the art can obtain other drawings according to these drawings without creative efforts.

DETAILED DESCRIPTION OF PREFERRED EMBODIMENTS

The technical solution in embodiments of the disclosure will be clearly and completely described in combination with drawings in embodiments of the disclosure. Obviously, the described embodiments are only one part of embodiments of the disclosure but not all the embodiments. Based on the embodiments of the disclosure, other embodiments obtained by persons of ordinary skill in the art without creative efforts all belong to the protective scope of the disclosure.

Embodiment

Figure 1:
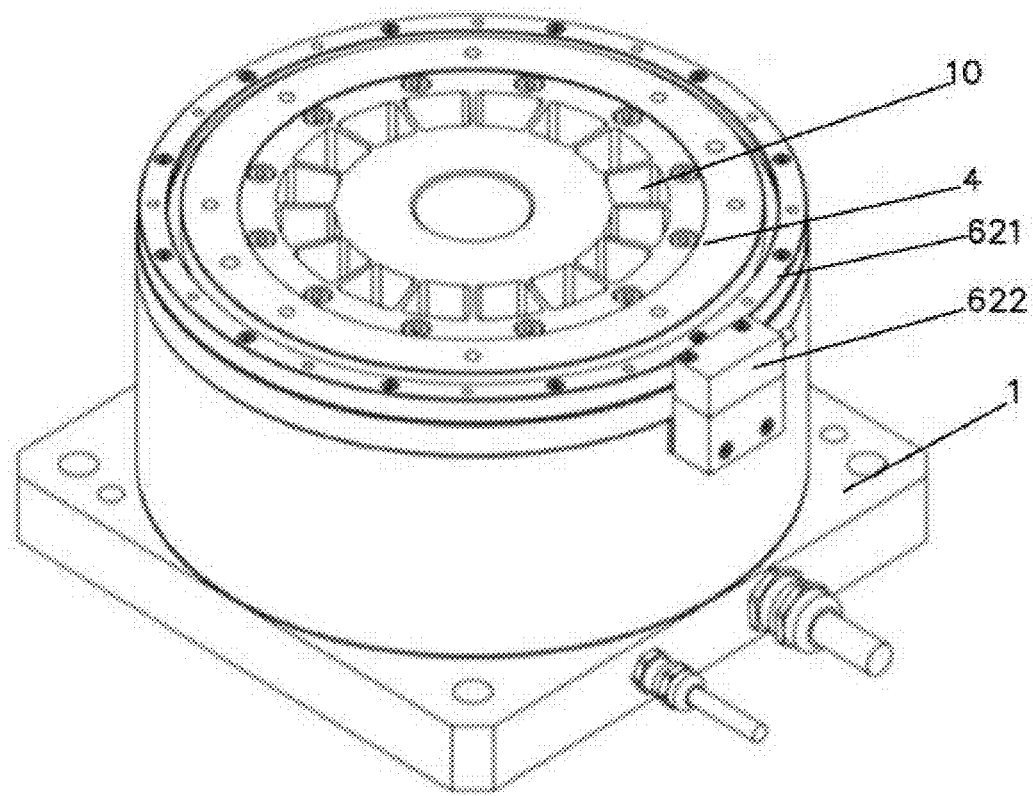
FIG. 1 is a structural diagram of a novel high-precision rigid-flexible coupling rotating platform according to the disclosure.
Figure 2:
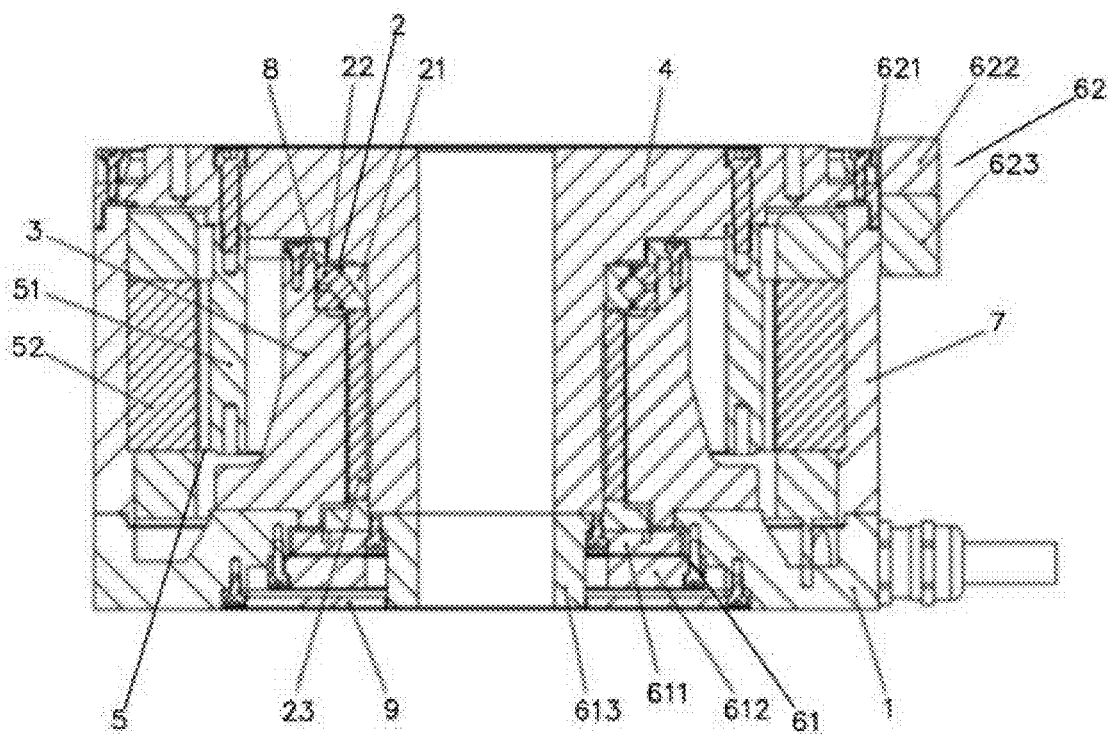
FIG. 2 is a sectional view of the rotating platform along a central axis according to the disclosure.
Figure 3:
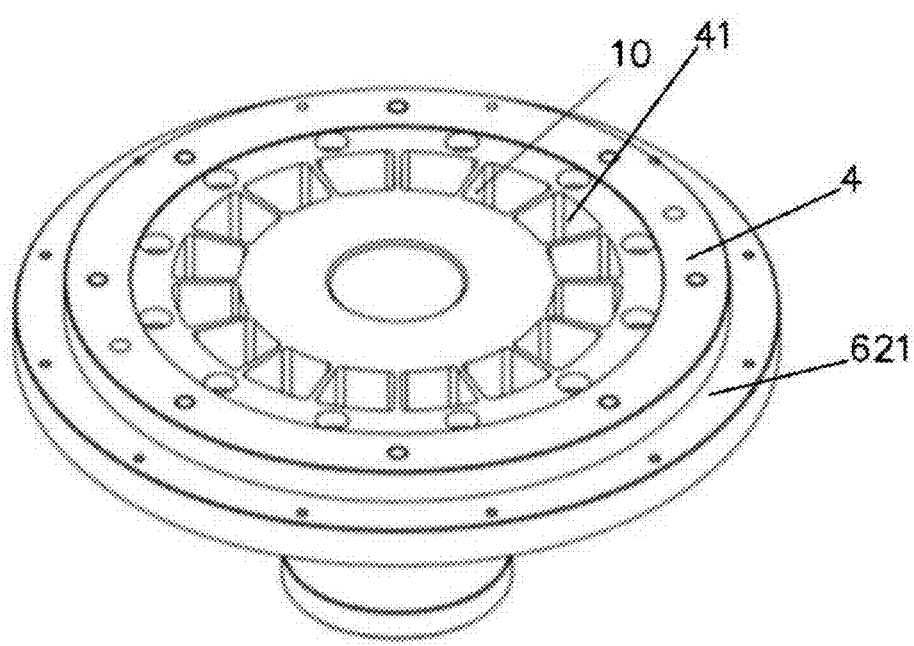
FIG. 3 is a structural diagram of an annular coding disc of a core rotating platform of the rotating platform according to the disclosure.

Referring to FIG. 1 to FIG. 3, this embodiment relates to a novel high-precision rigid-flexible coupling rotating platform, including a foundation 1, a rigid bearing 2, a bearing sleeve 3, a core rotating platform 4, a rotating driver 5 and a coder. The bearing sleeve 3 is fixed on the foundation 1; the rigid bearing 2 is in rotatable drive connection with the core rotating platform 4, and connected with the foundation 1 through the bearing sleeve 3; the rotating driver 5 is used for driving the core rotating platform to rotate; an upper surface of the core rotating platform 4 is provided with a groove 41 in which a plurality of groups of flexible hinges 10 are arranged; when the rotating driver 5 applies a driving force rotating the core rotating platform 4 to the core rotating platform 4, the driving force elastically deforms the flexible hinges 10; the flexible hinges 10 are symmetrically arranged.

In the disclosure, the flexible hinges 10 are used and arranged on the upper surface of the core rotating platform 4, that is, a structure where the flexible hinge 10 is externally arranged is adopted to solve the existing problems that the composite flexible hinge ring has a complicated structure, the main body ring is machined by at least using a five-axis machine tool, and machining cost is high. Furthermore, in the disclosure, without disassembling the entire rotating platform, corresponding groups of flexible hinges 10 can be changed, an assembling relationship between other groups of flexible hinges 10 is not broken, the effective deformation length of the flexible hinge is changed through a fixture so as to change the rigidity of the flexible hinge to realize adjustment of rigidity, thereby solving the existing problem that since the composite flexible hinge is arranged inside the rotating platform, when the flexible hinge 10 needs to be changed, the composite flexible hinge ring is changed as long as the entire rotating platform is disassembled to result in troublesome change and elapsed time.

In addition, the flexible hinge 10 and the core rotating platform 4 of the disclosure can be integrally formed, that is, the flexible hinge 10 and the core rotating platform can be designed into an integrated combination structure. When assembling, the flexible hinge 10 does not need to be reassembled, thereby decreasing the quantity of assembled pails and reducing the difficulty coefficient of assembling, and solving the existing problems that when the different rigidities of the composite flexible hinge ring are needed to be adjusted, it is needed to prepare a plurality of groups of flexible hinge slices 10 with different thicknesses; many parts are used, and machining and assembling precision requirements of many parts are high, thereby leading to high machining cost and large assembling difficulty so as to greatly affect the production efficiency.

When in working, the rotating driver 5 applies the driving force to the core rotating platform 4 under an action of an electromagnetic force. The driving force can elastically deform the flexible hinge 10 on the upper surface of the core rotating platform 4 and then allow the core rotating platform 4 to rotate along a hollow axle. The elastic deformation counter-acting force of the flexible hinge 10 on the core rotating platform 4 can be used for overcoming the friction force between motion pairs connected by the core rotating platform. When the elastic deformation counter-acting force of the flexible hinge 10 on the core rotating platform 4 is larger than resistances such as a static friction force between motion pairs connected by the core rotating platform, the core rotating platform 4 will be converted from a static state into a motion state.

Rotation of the core rotating platform 4 can be divided into two situations: a, when the elastic deformation counter-acting force of the flexible hinge 10 on the core rotating platform 4 is smaller than resistances such as a static friction force between motion pairs, the rotation amount of the core rotating platform 4 is the elastic deformation amount of the flexible hinges 10; b, when the elastic deformation counter-acting force of the flexible hinge 10 on the core rotating platform 4 is larger than resistances such as the static friction force between motion pairs, the rotation amount of the core rotating platform 4 is superposition of the elastic deformation amount of the flexible hinge 10 and the rotation amount of the gearing. When the motion states of the motion pairs connected by the core rotating platform 4 are switched between the above situations a and b, the difference between the static friction coefficient and dynamic friction coefficient of the motion pairs connected by the core rotating platform 4 leads to sudden friction force change to generate the rigidity impact on the rotating platform and cause the friction "crawling" of the motion pair. The core rotating platform 4 can depend on the elastic deformation of its own flexible hinges 10 to actively adapt to the sudden friction resistance change caused by state switching of the motion pair so as to relieve the rigidity impact of sudden friction resistance change on the core rotating platform. In above any case, the core rotating platform 4 can realize continuous rotation change by depending on the elastic deformation of the own flexible hinges 10 so as to avoid the influence of friction "crawling" on rotation positioning accuracy.

The coder includes a first group of coders 61 used for real-time measurement of a rotation angle of the core rotating platform 4 and a second group of coders 62 used for real-time measurement of a rotation angle of the rigid bearing 2. Through measurement data of these two groups of coders, the elastic deformation amount of the flexible hinges 10 slice can be indirectly measured, and the immeasurable friction force is converted into the elastic deformation amount of the flexible hinges 10. The rotation angle data of the core rotating platform 4 measured by the rotation angles of two groups of coders can serve as feedback links to form the closed-loop control system with the rotating driver 5 and the like, so as to realize the high-precision rotation positioning of the core rotating platform 4.

The first group of coders 61 includes a first coder annular code disc 611 fixedly mounted on the core rotating platform 4 and a first coder annular read head 612 fixedly mounted on the foundation 1 and corresponding to a position of the first coder annular code disc 611.

The second group of coders 62 includes an annular coding disc 621 fixedly mounted on an outer circumference of the core rotating platform 4 and a read head 622 fixedly mounted on the foundation 1 and corresponding to a position of the annular coding disc 621.

The first coder annular code disc 611 is fixedly connected to a bottom of the core rotating platform 4 through a code disc connector 613; the read head 622 is fixedly mounted on the outer round sleeve 7 through a code disc fixing member 623.

The first coder annular code disc 611 and the first coder annular read head 612 constitute the first group of coders 61. The first coder annular code disc 611 is fixed on the code disc connector 613, and the code disc connector 613 is fixed together with the core rotating platform 4 through bolt connection, and thus the first coder annular code disc 611 synchronously rotates along with the core rotating platform 4; meanwhile the first coder annular read head 612 is fixed together with the foundation 1 through bolt connection. Thus, the first group of coders 61 can measure the rotation angle of the rigid bearing 2 in any case in real time. In the meantime, as shown in FIG. 1 and FIG. 2, the annular coding disc 621 and the read head 622 constitute the second group of coders 622. Where the annular coding disc 621 is mounted on the outer circumference of the core rotating platform 4 through the code disc fixing member 623; the read head 622 is mounted on the foundation 1, and therefore this group of coders can measure the rotation angle of the core rotating platform 4 in any case in real time. Through the measurement data of these two groups of coders, the elastic deformation amount of the flexible hinge 10 can be indirectly measured, and the immeasurable friction force is converted into the measurable elastic deformation amount of the flexible hinge 10. The rotation angle data measured by rotation angles of two groups of coders can serve as feedback links to form a closed-loop control system with the rotating driver 5 and the like so as to realize the high-precision rotation positioning of the core rotating platform 4.

The foundation 1 is provided with an outer round sleeve 7 sleeved on the core rotating platform 4, the read head 622 is fixedly mounted on the outer round sleeve 7; the rotating driver 5 includes a motor rotator 51 connected with the core rotating platform 4 and capable of applying the driving force to the core rotating platform 4 under the action of electromagnetic force and a motor stator 52 fixed together with the outer round sleeve 7. Where, the motor stator 52 is fixed together with the outer round sleeve 7, and the outer round sleeve 7 is fixed through bolt connection; the motor rotator 51 is connected with the core rotating platform 4 and can apply the driving force to the core rotating platform 4 under the action of the electromagnetic force.

A bearing inner ring 21 of the rigid bearing 2 is in interference fit connection with the core rotating platform 4, and in interference fit connection with the foundation 1 through an axle sleeve 23. The bearing inner ring 21 of the rigid bearing 2 is in interference fit connection with the core rotating platform 4 so that the core rotating platform 4 can rotate along the hollow axis. A bearing outer ring 22 of the rigid bearing 2 is clamped and fixed with by the bearing sleeve 3 and the clamping member 8 of the bearing outer ring.

The foundation 1 is provided with a bottom cap 9 covering the first group of coders 61. The bottom cap 9 is fixed together with the foundation 1 through bolt connection and covers the first group of coders 61, so as to take the effect of protection.

In conclusion, a method for realizing the above rigid-flexible coupling rotating platform mainly includes the following steps:

(1) The rotating driver 5 directly drives the core rotating platform 4, and when the driving force cannot overcome the static friction of the rigid platform, the core rotating platform 4 generates tiny rotation through the elastic deformation of the flexible hinge to realize precise tiny rotation.

(2) When the driving force is enlarged, the friction force is overcome to drive the rigid bearing 2 to move, and at this moment, the elastic deformation is enlarged to a certain degree, the rigid bearing enters into a limit state, all the driving forces are transferred to the rigid bearing 2 so that high-speed motion is realized.

(3) When stopping, the core rotating platform 4 is firstly braked, the flexible hinge drives the rigid bearing 2 to brake so as to damp the vibration energy.

In summary, the rigid-flexible coupling motion platform of the disclosure has the advantages:

1. The friction-free flexible hinge motion pair is used to realize high-precision continuous change rotation, avoiding the rotation "shaking" cased by sudden accelerated speed change resulting from the friction state switching of the motion pair.

2. The rigid-flexible coupling rotating platform design is adopted, and the used flexible hinge ring can depend on its own elastic deformation to actively adapt to the friction force change of the motion pair, avoiding the influence of "crawling" caused by friction state switching of the motion pair on continuous rotation positioning and facilitating achievement of higher positioning accuracy.

3. The design of the rotating platform with double coders is adopted, the immeasurable friction force is converted into the measurable elastic deformation of the composite flexible hinge ring, and the obtained data feedback can realize more accurate control compensation.

4. The motion platform adopts a single-drive closed-loop control system, and the adopted driver and coders are connected to the core rotating platform 4. The control system is simple in design and higher in reliability.

Figure 4:
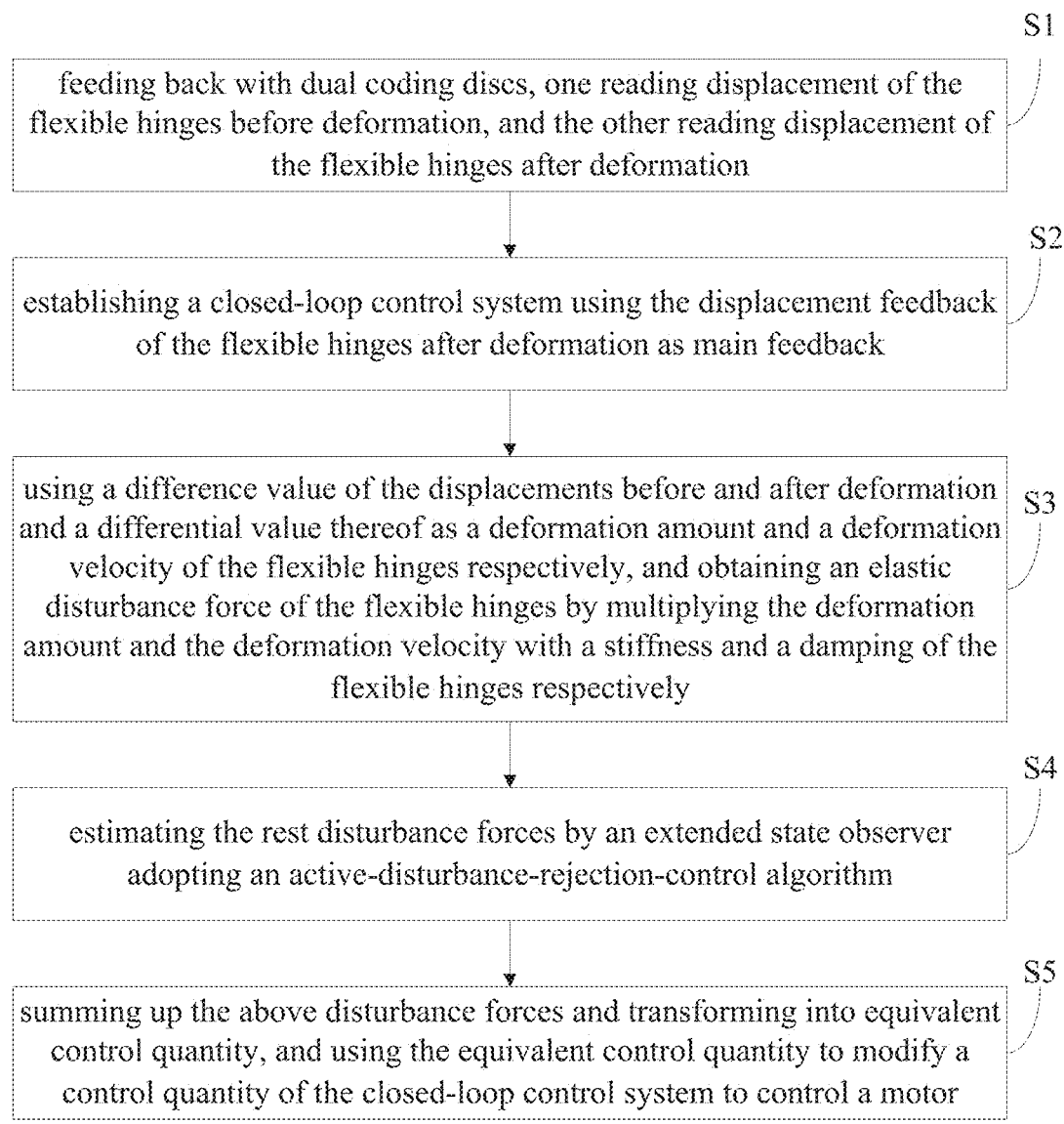
FIG. 4 is a flowchart of a method for controlling a rigid-flexible coupling rotating platform according to the disclosure.

Meanwhile, aiming at the above rigid-flexible coupling rotating platform, the disclosure also provides a corresponding control method. The control method is as shown in FIG. 4, including the following steps:

S1, feeding back with dual coding discs, one reading the displacement of the flexible hinges 10 before deformation, and the other reading the displacement of the flexible hinges 10 after deformation;

S2, establishing a closed-loop control system using displacement feedback of the flexible hinges 10 after deformation as main feedback;

S3, using a difference value of the displacements before and after deformation and a differential value thereof as a deformation amount and deformation velocity of the flexible hinges 10 respectively, and obtaining an elastic disturbance force of the flexible hinges 10 by multiplying the deformation amount and the deformation velocity with a stiffness and damping of the flexible hinges 10 respectively;

S4, estimating the rest disturbance forces by an extended state observer adopting an active disturbance rejection control algorithm; and S5, summing up the above disturbance forces and transforming into equivalent control quantity, and using the equivalent control quantity to modify a control quantity of the closed-loop control system to control a motor.

The above description is only one preferred embodiment of the disclosure, of course, cannot be used for limiting the scope of the claims of the disclosure, and therefore equivalent changes made according to the claims of the disclosure still belong to the scope of the disclosure.

We claim:

1. A rigid-flexible coupling rotating platform, comprising a foundation, a rigid bearing, a bearing sleeve, a core rotating platform, a rotating driver and a coder, wherein the bearing sleeve is fixed on the foundation; the rigid bearing is in rotatable drive connection with the core rotating platform, and connected with the foundation through the bearing sleeve; the rotating driver is used to drive the core rotating platform to rotate; an upper surface of the core rotating platform is provided with a plurality of groups of flexible hinges; when the rotating driver applies a driving force to rotate the core rotating platform, the driving force elastically deforms the flexible hinge rings; the coder comprises a first group of coders used for real-time measurement of a rotation angle of the core rotating platform and a second group of coders used for real-time measurement of a rotation angle of the rigid bearing; and the second group of coders comprises a second annular coding disc fixedly mounted on an outer circumference of the core rotating platform and a second read head fixedly mounted on the foundation and corresponding to a position of the first annular coding disc.

2. The rotating platform according to claim 1, wherein the flexible hinges and the core rotating platform are integrally formed.

3. The rotating platform according to claim 1, wherein the first group of coders comprises a first coder annular code disc fixedly mounted on the core rotating platform and a first coder annular read head fixedly mounted on the foundation and corresponding to a position of the first coder annular code disc.

4. The rotating platform according to claim 1, wherein the flexible hinges are symmetrically arranged.

5. The rotating platform according to claim 1, wherein the foundation is provided with an outer round sleeve sleeved on the core rotating platform, and the second read head is fixedly mounted on the outer round sleeve; the rotating driver comprises a motor rotator connected with the core rotating platform and capable of applying the driving force to the core rotating platform under an action of an electro-magnetic force, and a motor stator fixed with the outer round sleeve.

6. The rotating platform according to claim 1, wherein a bearing inner ring of the rigid bearing is in interference fit connection with the core rotating platform, and a bearing outer ring of the rigid bearing is clamped and fixed by the bearing sleeve and a clamping member of the bearing outer ring.

7. A rotating platform, comprising a foundation, a rigid bearing, a bearing sleeve, a core rotating platform, a rotating driver and a coder, wherein the bearing sleeve is fixed on the foundation; the rigid bearing is in rotatable drive connection with the core rotating platform, and connected with the foundation through the bearing sleeve; the rotating driver is used to drive the core rotating platform to rotate; an upper surface of the core rotating platform is provided with a plurality of groups of flexible hinges; when the rotating driver applies a driving force to rotate the core rotating platform, the driving force elastically deforms the flexible hinge rings; the coder comprises a first group of coders used for real-time measurement of a rotation angle of the core rotating platform and a second group of coders used for real-time measurement of a rotation angle of the rigid bearing; and the foundation is provided with a bottom cap covering the first group of coders.

8. The rotating platform according to claim 1, wherein the first coder annular code disc is fixedly connected to a bottom of the core rotating platform through a code disc connector; and the first coder annular read head is fixedly mounted on the outer round sleeve through a code disc fixing member.

9. A method for controlling the rotating platform according to claim 1, comprising the following steps:
   S1, feeding back with dual coding discs, one reading displacement of the flexible hinges before deformation, and the other reading displacement of the flexible hinges after deformation;
   S2, establishing a closed-loop control system using the displacement feedback of the flexible hinges after deformation as main feedback;
   S3, using a difference value of the displacements before and after deformation and a differential value thereof as a deformation amount and a deformation velocity of the flexible hinges respectively, and obtaining an elastic disturbance force of the flexible hinges by multiplying the deformation amount and the deformation velocity with a stiffness and a damping of the flexible hinges respectively;
   S4, estimating the rest disturbance forces by an extended state observer adopting an active-disturbance-rejection-control algorithm; and
   S5, summing up the above disturbance forces and transforming into equivalent control quantity, and using the equivalent control quantity to modify a control quantity of the closed-loop control system to control a motor.

* * * * *